Figure 2:
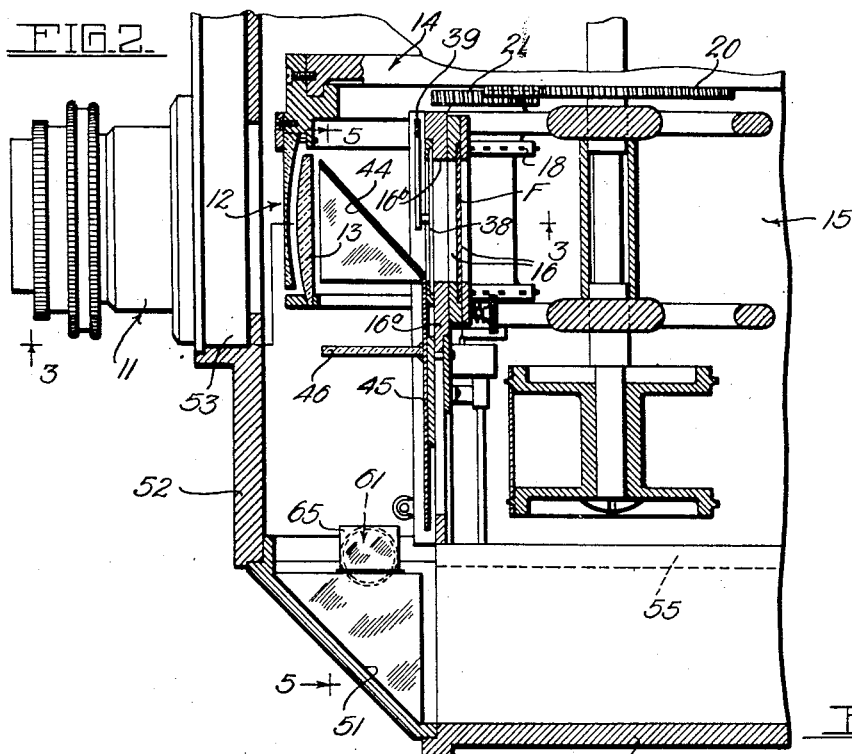

Nov. 13, 1934.  G. G. MORENO  1,980,217
LIGHT GAUGING APPARATUS
Filed June 29, 1931  3 Sheets-Sheet 1
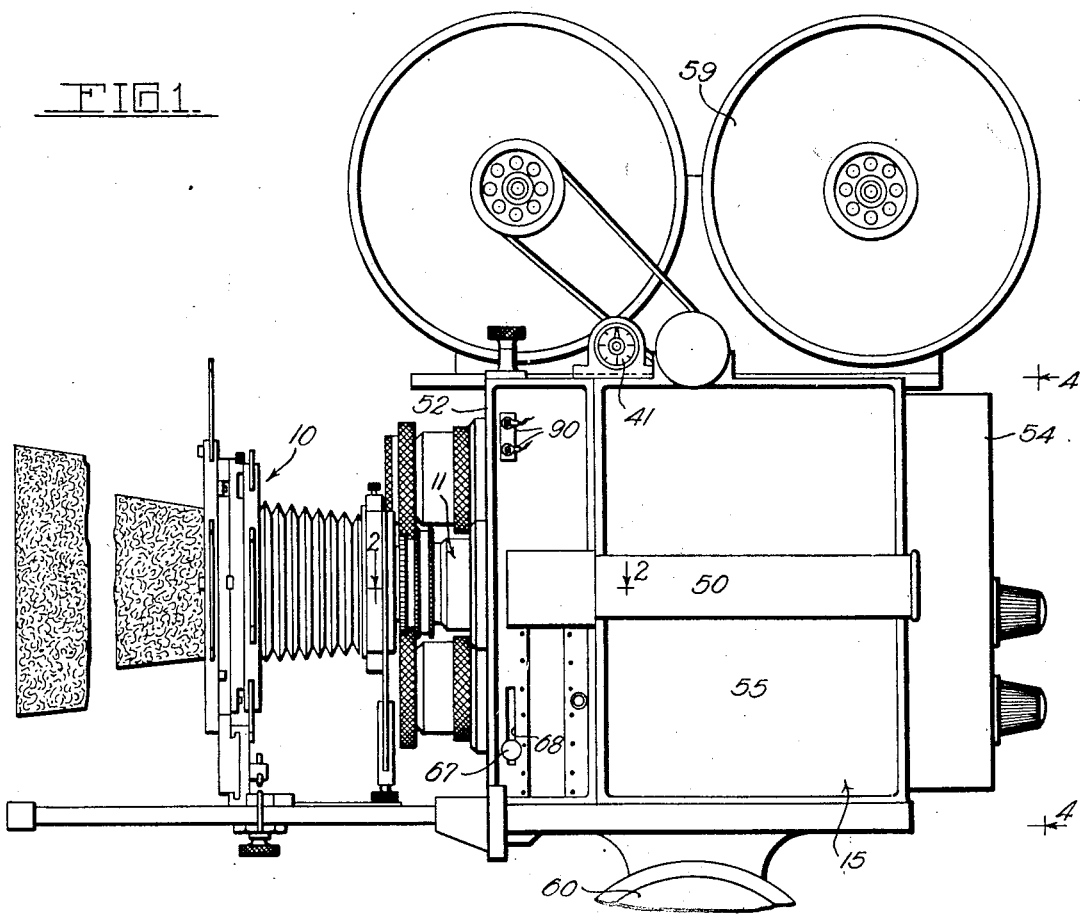
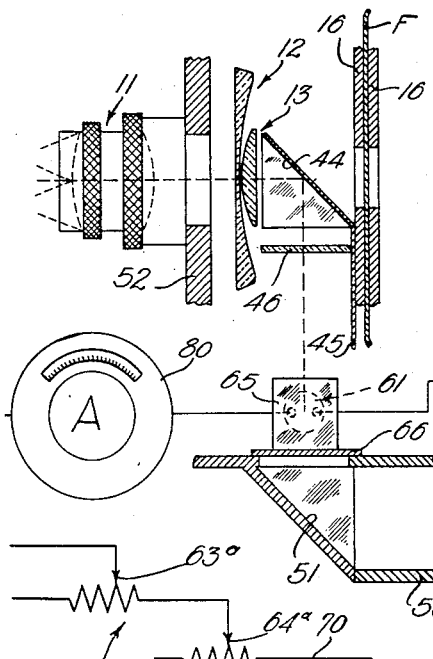
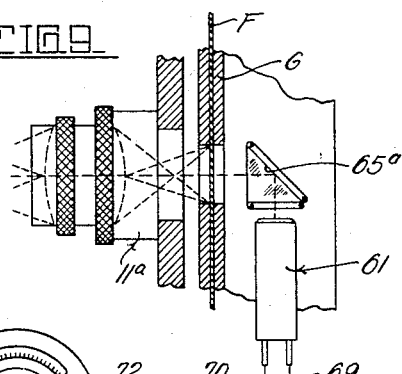
INVENTOR
GABRIEL GARCIA MORENO
BY
HIS ATTORNEY INVENTOR
GABRIEL GARCIA MORENO
By
W. H. Chapwell
HIS ATTORNEY.

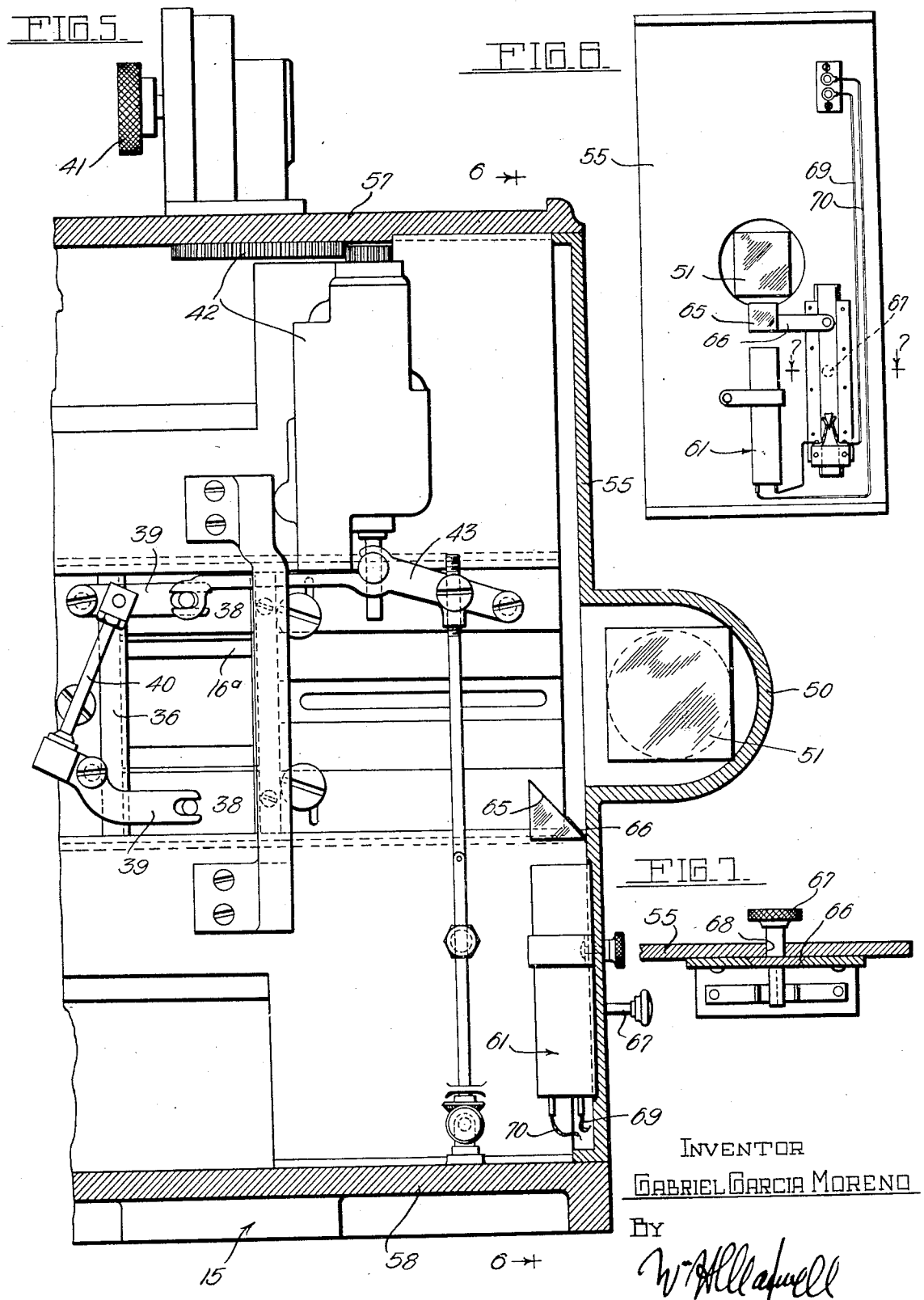

Patented Nov. 13, 1934

1,980,217

UNITED STATES PATENT OFFICE 1,980,217

LIGHT GAUGING APPARATUS

Gabriel Garcia Moreno, Los Angeles, Calif., assignor to Moreno-Snyder Cine Corporation, Ltd., Los Angeles, Calif., a corporation of Delaware Application June 29, 1931, Serial No. 547,642

8 Claims. (Cl. 88—23)

This invention has to do with light gauging apparatus, and has particular reference to apparatus useful for determining the proper relationship of the various factors entering into the taking of a picture. It is a general object of the present invention to provide apparatus by which a photographer can accurately determine the proper setting or regulation of a camera for any particular object to be photographed.

In taking pictures, there are several important factors that must be taken into account and which must be properly balanced or related if the best results are to be obtained. I refer particularly to factors such as the characteristics of the film, the time of exposure, the volume of light admitted during exposure, and the intensity or character of the light from the subject being photographed. In accordance with the practice now followed in taking photographs, either still pictures or motion pictures, the factors mentioned are governed by the photographer largely by guess or approximation based upon the experience of the photographer, there being no commercially practical means available by which these factors can be accurately related and balanced to the light from the subject to be photographed.

The characteristics of the film may be said to be fixed or capable of accurate determination if we take into consideration only the film up to the time of exposure. In practice, it is necessary to take into account as a characteristic of the film the development or treatment of the film following exposure. Developers and treatment used in developing film vary; and, therefore, it may be said that the characteristics of the film present a variable factor that must be related or balanced to the other factors mentioned in order to obtain the best results.

The time of exposure and the volume of light admitted during exposure are factors which have a direct bearing one on the other and must be varied one with the other in order to retain a proper relationship or balance between them. These factors, properly related or balanced, should be properly related to the other factors mentioned.

The light from the subject being photographed is probably the most difficult factor to handle, as it usually involves high lights and shadows the values of which are extremely difficult to estimate. In many cases, this factor is beyond control of the photographer and, therefore, becomes the factor from which or to which the various other factors are balanced. It is to be understood, of course, that in many instances artificial lighting and reflection of light are resorted to by the photographer in establishing the light on or from the subject, giving the photographer a means of varying or regulating the light reaching the camera from the subject.

It is a general object of the present invention to provide a device operable to gauge the light from a subject to be photographed, so that an operator can accurately relate the various other factors requiring consideration in the taking of a picture or pictures.

Another object of this invention is to provide gauging apparatus for use in determining the setting or operation of a camera embodying various elements corresponding to the variable factors entering into the operation of the camera, which elements are related to correspond to the relationship of the said variable factors.

Figure 3:
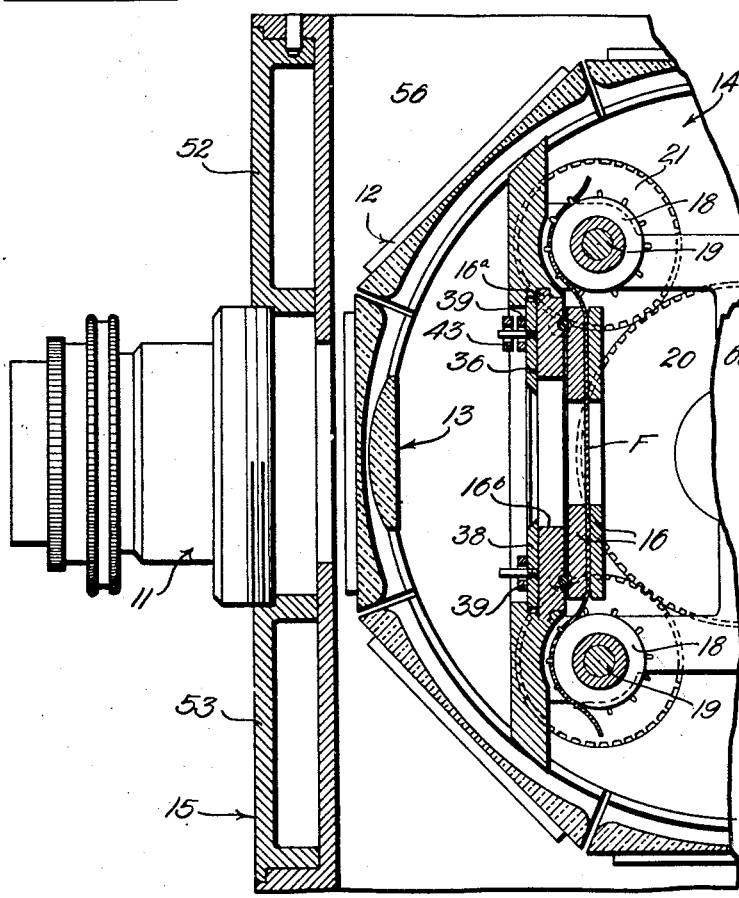
Figure 4:
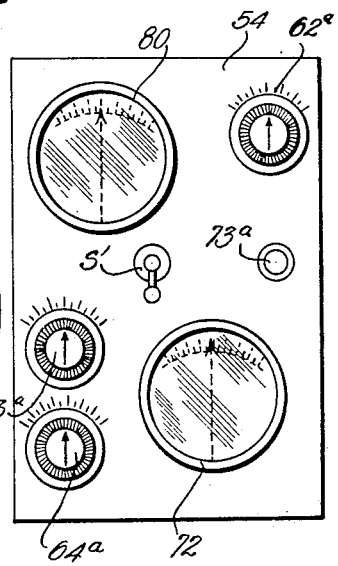

The various objects and features of my invention will be best and more fully understood from the following detailed description of typical forms and applications of the invention, throughout which description reference will be had to the accompanying drawings, in which:

Fig. 1 is a side elevation of a motion picture camera embodying the apparatus provided by this invention. Fig. 2 is an enlarged horizontal detailed sectional view of a portion of the camera, being a view taken substantially as indicated by line 2—2 on Fig. 1. Fig. 3 is a vertical detailed sectional view taken as indicated by line 3—3 on Fig. 2. Fig. 4 is a view showing the back of the camera, being a view taken as indicated by line 4—4 on Fig. 1. Fig. 5 is a detailed view taken substantially as indicated by line 5—5 on Fig. 2, the moving lens element of the camera being removed. Fig. 6 is a reduced view taken as indicated by line 6—6 on Fig. 5. Fig. 7 is an enlarged detailed transverse sectional view taken as indicated by line 7—7 on Fig. 6. Fig. 8 is a diagrammatic view illustrating the apparatus of the present invention, and Fig. 9 is a view illustrating the application of the invention to a camera of a type different from that illustrated throughout the other figures of the drawings.

The apparatus of the present invention is, in accordance with the broader principles of the invention, capable of a wide range of application in that it can be employed as a unit or device independent of any other structure or device or may be embodied in a device, such as a camera, as an attachment or as a part of the camera. The last-mentioned application, i. e., the embodiment of the invention as attached to or incorporated in a camera, is preferred in that it places the device under operating conditions identical with those under which the camera operates; in fact, it makes possible the determination of the factors under the same lens conditions as the picture or picture are to be taken. It is to be understood that the invention may be employed in connection with the taking of still pictures or motion pictures, the principles involved in these two types of photography being identical insofar as the present invention is concerned.

In Figs. 1 to 8 inclusive of the drawings, I illustrate a typical form or embodiment of the invention applied to a motion picture camera of the type in which the film is operated continuously and the optical system operated in order to obtain successive pictures of the subject in a series longitudinally on the film. The particular camera illustrated throughout the drawings is of the general construction set forth and claimed in my co-pending application entitled Motion picture optical system and apparatus, Serial Number 531,200, filed April 18, 1931. Other features of construction illustrated throughout the drawings are the subject of other pending applications that will be hereinafter mentioned.

In Fig. 9 of the drawings I illustrate an application of the invention to the ordinary or usual type of camera, say, a motion picture camera, embodying the typical stationary lens system and a film carried by a gate and adapted to be intermittently moved to bring picture areas into register with the lens system.

Referring particularly to Figs. 1 to 8 inclusive of the drawings, the optical system of the camera includes, generally, a mat box 10, an objective lens 11 behind the mat box 10, a revolving series of lenses elements 12 operating across the axis of the optical system at a single point behind the objective lens, and a corrective lens 13 located between the film F and the point in the optical system through which the lens elements 12 operate. The mat box 10 projects forward from the objective lens and carries a mat which operates to determine the frame or size of the pictures obtained on the film. The objective lens 11 may be of the general type ordinarily employed in motion picture cameras and, in practice, may be mounted and adjusted in the manner common to objective lenses. The lens elements 12 are carried by a revolving lens carrier 14 and are arranged to project axially from the periphery of the lens carrier so that they form an annular series of lenses. The lens carrier 14 is mounted in the body 15 of the camera so that the lens elements 12 pass through the optical system at a definite point longitudinally of the optical system. The lens elements, in moving through or across the optical system, deflect the light passed by the objective lens and cause the image falling on the film F to move or shift in synchronism with the movement of the film, the film being moved continuously. The corrective lens 13 is mounted in a definite position between the film F and the point in the optical system through which the lens elements 12 move, and is designed to correct enlargement and distortions caused by the lens elements 12.

The film F is guided through or across the axis of the optical system at the desired point by a film guide or gate including co-operating plates 16 which form a channel that slidably carries the film. The plates 16 are supported from a member 16ª in the form of a plate suitably mounted in the body of the camera in front of the gate; and have an opening 16ᵇ for passing light from the optical system to the film. The film F is operated through the film gate by drive sprockets 18 located at the ends of the gate. The drive sprockets 18 are mounted on shafts 19 suitably supported in the body of the camera. A pinion 20 is fixed to the lens carrier 14 to revolve therewith and to mesh with gears 21 on the shafts 19, causing the film drive sprockets 18 to operate in synchronism with the lens carrier 14. The gearing is such as to give the film the desired speed with reference to the movement of the lens elements 12. A suitable drive is provided for operating this lens carrier.

The camera includes a light control for regulating or governing the volume of light admitted to the film. In the construction illustrated, a vertical guideway 36 is provided at the front of the plate member 16ª to carry light-regulating shutters 38. The shutters 38 are carried by the guideway so that they extend transversely of the aperture 16ᵇ and are shiftable vertically to vary the vertical extent of the opening admitting light to the film F. The shutters 38 are connected together to operate in opposite directions and are provided with suitable operating means. In the construction illustrated, each shutter is carried by a lever arm 39, and a link 40 connects the lever arms so that they operate in opposite directions when moved. A suitable operating mechanism is provided for the structure just described, for instance, a manual operating knob 41 is provided at the exterior of the camera body 15, and a suitable drive mechanism 42 connects the knob 41 with an operating lever 43 which connects with one of the arms 39. The details of this mechanism are fully set forth and claimed in my co-pending application entitled Light control for cameras, Serial Number 531,202, filed April 18, 1931.

The camera is further provided with means for viewing the subject to be photographed through the lens system of the camera. The particular structure illustrated in the drawings includes a reflector 44 supported by a carrier 45 so that it can be shifted into and out of position between the corrective lens 13 and the film F. The reflector 44 is disposed at an angle so that light passing the optical system is reflected laterally onto a screen or ground glass 46. The ground glass 46 is preferably supported by the carrier 45 to bear the same relationship to the optical system as the film F when the reflector 44 is in operating position, as shown in Fig. 2. When the camera is operated to photograph, the carrier 45 is shifted so that the reflector 44 is moved out of the path of the optical system, allowing the light to pass to the film F. The camera is provided with a viewing device enabling the operator to view the ground glass 46 from the rear of the camera. The viewing device includes a tubular structure 50 on one side of the camera body and a reflector 51 at the inner end of the device 50 enabling the operator to view the ground glass 46. The structure just described is more fully set forth and is claimed in my co-pending application entitled Viewing and focus-finding device for cameras, Serial Number 531,201, filed April 18, 1931.

The camera body 15 illustrated throughout the drawings is a box-like structure including a front 52 which carries the lens mount 53, a back 54, sides 55 and 56, a top 57, and a bottom 58. A suitable film magazine 59 is mounted on the top 57 of the camera body, while the bottom 58 of the body is provided for connection with a suitable mounting or tripod head 60.

The present invention provides, generally, means 61 responsive to light, preferably a photo-electric cell connected in an electric circuit energized by a battery B, or the like, means 62 for varying the potential of the circuit in which the photo-electric cell is connected, said means 62 corresponding to a variable factor entering into the taking of a picture, and various other features the details and functions of which will be hereinafter described.

The various elements of the present invention are shown applied to or embodied in the camera hereinabove mentioned, the particular application and arrangement of parts being merely one manner in which the invention may be applied to a camera.

The means 61 or photo-electric cell is adapted to be exposed to light entering the camera through the optical system and, being sensitive to light in the manner characteristic of photo-electric cells, varies in electrical conductivity, depending upon the light falling upon it. The photo-electric cell applied to the particular camera under consideration is preferably adapted to be exposed to light from the ground glass 46 in that the light falling on the ground glass corresponds to that falling on the film when the picture is taken. The ground glass 46 in the case illustrated being part of the viewing device provided to allow the operator to view the subject through the lens of the camera, it is preferred to provide a reflector 65 shiftable into and out of the path of light from the ground glass and adapted when in the path of such light to direct it to the photo-electric cell 61. In the construction illustrated, the photo-electric cell is shown mounted on the inner wall of the side 55 of the camera body 15, and the reflector 65 is in the form of a prism supported by a carrier 66 shiftably mounted on the inner wall of the side 55 of the camera body and adapted to be operated from the exterior of the body through an operating knob 67 projecting through a slot 68 in the side of the camera body. When the carriage 66 is in the down position, the reflector 65 is out of the path of light in the viewing device, enabling the operator to obtain an unobstructed view of the subject through the viewing device. When it is desired to gauge the light entering the camera to determine the value of the light to fall upon the film F, the carriage 66 may be shifted upwardly to bring the prism 65 in line with the ground glass 46.

The photo-electric cell may be of any desired type or construction, it being preferred to employ a simple type of photo-electric cell, for instance, a selenium cell sufficiently sensitive to respond to variations in light entering the camera and affecting the taking of pictures.

The photo-electric cell 61 is connected with the battery B in what I will term the main circuit. A conductor or line 69 connects one terminal of the battery B with one terminal of the photo-electric cell 61, while a conductor or line 70 connects the other terminal of the battery with the other terminal of the photo-electric cell. A main control switch S is connected in one of the lines, for instance, it may be connected in the line 69, as shown in the diagram Fig. 8.

The means 62 provided for varying the potential of the main circuit in which the photo-electric cell is connected includes a variable resistance or rheostat connected in one of the lines, e. g., in the line 70 adjacent the battery B. In the preferred circuit, a line 71 is connected between the line 69 and the resistance of the rheostat 62 so that there is a direct connection between the line 69 leaving the battery B and the line 70 leaving the battery B through the resistance of the rheostat or means 62. The main circuit carrying the photo-electric cell is connected in parallel with the circuit through the line 71, and its potential can be regulated by means of the rheostat.

The present invention provides means for determining the potential of the main circuit, which means preferably includes an ampere-meter 72 and a control switch 73 connected in series in a line 74 connected across or between the lines 69 and 70 in parallel with the line 71. In practice, very little energy is necessary in the main circuit and, therefore, the meter 72 is preferably such as to gauge the milliamperemeters in the main circuit. The switch 73 is normally open.

The means 62 corresponds to a variable factor in the taking of pictures, for instance, it may correspond to the film. The film, due to variations in emulsion, developer, and treatment in course of development, is a variable factor. Variations corresponding to those of the film are obtained in the apparatus of the present invention by varying the potential on the main circuit through the rheostat or means 62. In practice, the ampere-meter 72, instead of being graduated in milli-amperemeters, may be graduated in units denoting different types of film emulsion and/or developers or processes of developing the film. For example, by test it can be determined that, for a given film emulsion developed by a given developer or by a given process of development, a certain definite potential is required in the main circuit carrying the photo-electric cell. The same film or emulsion treated with a different developer will give a different character or result in the finished picture and, therefore, a corresponding variation is required in the potential of the main circuits carrying the photo-electric cell. In general, it may be stated that the rheostat or means 62 is provided to vary the potential of the main circuit carrying the photo-electric cell 61 to correspond to variation in the characteristics of the film F.

The means 63 and 64 are in the nature of units of variable resistance or rheostats connected in series in the main circuit, say, for instance, in the line 70, where they do not influence the determination of the potential in the main circuit by the amperemeter 72 and switch 63. The variable means or rheostat 63 may be such as to correspond to the variable factor of time in the taking of pictures, while the variable means or rheostat 64 may correspond to the variable factor of volume of light in the taking of pictures. In this case, the resistance involved in the rheostat 63 is balanced or related to the other parts in the circuit to correspond to or be in proportion to the time element in the taking of pictures; and, in a like manner, the resistance of the rheostat 64 is made such as to correspond to or be in proportion to the variable factor of volume of light in the taking of pictures.

An amperemeter 80 is connected in the main circuit, for instance, in the line 70, to indicate the resistance introduced in the main circuit by the photo-electric cell 61, the time rheostat 63, and the volume rheostat 64. In practice, I employ a micro-amperemeter, as the variations in the photo-electric cell are slight although definitely responsive to the light falling upon the cell. The meter 80 is preferably graduated to show normal or accurate balance of the various factors and plus and minus conditions, the factors handled by the main circuit being the light from the subject and the time of exposure. The meter 80 will indicate normal exposure or proper balance of conditions and plus or over-exposure or minus or under-exposure. The photo-electric cell, being responsive to the light from the subject, needs no means for indicating its condition of operation apart from the other elements in the circuit, but the time rheostat 63 and the volume rheostat 64 preferably are provided with scales, as shown in Fig. 4, indicating their conditions or settings in terms of time and shutter opening, respectively. The scale or graduations in connection with the control 63ª of the rheostat 63 may, in the case of a motion picture camera, indicate the number of pictures per second, while the scale or graduations in connection with the control member 64ª of the rheostat 64 may indicate full open and closed conditions of the shutters and variations between full open and closed conditions.

The various control elements or parts of the structure just described are preferably assembled in a group at the back 54 of the camera body. In Fig. 4 of the drawings, I illustrate the meters 72 and 80, the control member S¹ of the main switch S, the control member 62ª of the rheostat 62, the control member 73ª of the switch 73, and the control members 63ª and 64ª of the rheostats 63 and 64 respectively. A suitable scale indicating film characteristics is preferably provided in connection with the control member 62ª of the rheostat 62, and suitable scales are provided in connection with the control members 63ª and 64ª as will be seen from Fig. 4 of the drawings.

It will be readily understood that the source of electrical energy, for instance, the battery B, may be located remote from the camera, in which case the circuit may be conducted to the camera through suitable terminals 90 suitably located on the camera. The various electrical devices may be located in the camera, for instance, within the body 15 of the camera, and suitable electrical connections made entirely within the camera.

To operate the device of the present invention, the operator, knowing the grade or type of film he is about to use, determines the character of developer or treatment to be given the film after exposure and then correspondingly sets the potential on the main circuit by varying the rheostat 62, observing the setting of the circuit by depressing the switch 73 and reading the meter 72. Having set the potential of the main circuit according to the characteristics of the film being used, the light entering the lens system of the camera is directed onto the photoelectric cell 61, this being accomplished by shifting the reflector 44 into the direct path of light from the lens and the reflector 65 into the path of light from the ground glass 46. The light falling on the photo-electric cell establishes an electrical condition in the cell corresponding to the light condition entering the camera. The proper balance of conditions may then be established by adjusting the rheostats 63 and 64 to the proper balance to bring the reading of the meter 80 to normal. This condition may in some cases be brought about by leaving one of the rheostats 63 or 64 set and varying the other, or it may be brought about by varying both of the rheostats 63 and 64. In the case of motion picture photography, it is usual to run the film at a fixed speed; and, therefore, the time rheostat would be set for the desired speed and the volume rheostat adjusted until the desired condition is indicated by the meter 80. Having gauged the condition in the manner just described, the operator has a definite reading or information available for accurate setting or adjusting of the camera to obtain the best results. It is to be understood, of course, that the operator may wish to slightly under-expose or over-expose a particular scene or picture, in which case suitable consideration can be given to the readings of the meter 80 and to the setting of the rheostats 63 and 64.

In the form of the invention illustrated in Fig. 9 of the drawings, the invention is shown applied to the ordinary or common type of camera, in which there is an objective lens 11ª casting an image on the film F carried in a suitable gate G. A reflector 65ª is shown immediately behind the gate in register with apertures in the gate to receive light from the film F and reflect it to the photo-electric cell 61. It is apparent that in this application of the invention the reflector 65ª may be fixed in position, and it will be apparent that, in all other respects, the invention may be carried out as hereinabove described.

Having described only typical preferred forms of my invention, I do not wish to limit myself to the specific details set forth, but wish to reserve to myself any changes or variations that may appear to those skilled in the art or fall within the scope of the following claims.

Having described my invention, I claim:

1. A device for determining the proper relation of factors of photography including a photoelectric element, means for varying the potential of the circuit of the element, means in the circuit of the element for varying the resistance of the circuit, and a device in the circuit indicating the resistance of the circuit, the element and said means being related so that one of said means corresponds to the film used and the other means corresponds to the light conditions, each of said means including an operating member, and a graduated scale to be read together with the position of the member to indicate the respective factor of photography.

2. A device for determining the proper relation of factors of photography including a photoelectric element, means for varying the potential of the circuit of the element and related to the element to correspond to the film to be used, a plurality of independently operatable means in the circuit of the element for varying the resistance of the circuit, a device in the circuit indicating the resistance of the circuit, the element and the last mentioned means being related so that the means corresponds to the exposure time and the light condition, each of said means including an operating member and a graduated scale to be read together with the position of the member to indicate the respective factor of photography.

3. A device for determining the proper relation of factors of photography including a photoelectric element, means for exposing the element to light from the subject to be photographed through a camera lens, means for varying the resistance of the circuit of the element including an operating member, a scale in connection with said member for indicating film exposure time, means for varying the potential of the circuit of the element, including an operating member, a scale in connection with the last mentioned member for designating the character of the film used, and means for indicating the resistance of the circuit.

4. In combination, a camera including a lens, a photo-electric element adapted to be exposed to light passed by the lens, means for varying the potential of the circuit of the element including an operating member, and a scale in connection with the member for designating the character of the film to be used, means for varying the resistance of the circuit of said element, including an operating member, and a scale in connection with the last mentioned member for indicating film exposure time and means for indicating the resistance of the circuit of the element.

5. In combination, a camera including a lens a photo-electric element, means for controlling the admission of light passed by the lens to said element, means for varying the potential of the circuit of said element including a movable control member, and a scale to be read in connection with the position of the member to designate the film to be used, a variable resistance in the circuit of the element related to the element to condition the circuit in conformance with the exposure time, and means indicating the resistance of the circuit.

6. In combination, a camera, a photo-electric element carried by the camera and adapted to receive light passed by a lens, means for varying the potential of the circuit of the element, including a control member operatable from the exterior of the camera, and a graduated scale to be read in connection with the position of the member to designate the character of the film to be used, a variable resistance in the circuit of the element including a control member operatable from the exterior of the camera and a graduated scale to be read together with the position of the control member to indicate the light condition, and means indicating the resistance of the circuit and located to be read from the exterior of the camera.

7. In combination, a camera, a photo-electric element carried by the camera and adapted to receive light passed by a lens, means for varying the potential of the circuit of the element including a control member operatable from the exterior of the camera, and a graduated scale to be read in connection with the position of the member to designate the character of the film to be used, means indicating the potential of the circuit of the element located to be read from the exterior of the camera, a variable resistance in the circuit of the element including a control member operatable from the exterior of the camera, and a graduated scale to be read together with the position of the control member to indicate the light condition, and means indicating the resistance of the circuit and located to be read from the exterior of the camera.

8. In combination, a camera, a photo-electric element carried by the camera and adapted to receive light passed by a lens, means for varying the potential of the circuit of the element including a control member operatable from the exterior of the camera, and a graduated scale to be read in connection with the position of the member to designate the character of the film to be used, means indicating the potential of the circuit of the element located to be read from the exterior of the camera, two individually operatable units of variable resistance in the circuit of the element, each unit including a control member operatable from the exterior of the camera and a graduated scale to be read together with the position of the control member, the reading of the scale of one unit indicating the light condition and the reading of the scale of the other unit indicating the exposure time, and means indicating the resistance of the circuit and located to be read from the exterior of the camera.

GABRIEL GARCIA MORENO.